US012721767B2

(12) United States Patent
Harris et al.

(10) Patent No.: US 12,721,767 B2
(45) Date of Patent: Sep. 1, 2026

(54) ADJUSTABLE BED ASSEMBLY HAVING A SUPPORT ATTACHMENT

(71) Applicant: Ergomotion, Inc., Goleta, CA (US)

(72) Inventors: Richard Harris, Wyoming, MI (US); Eric Bryant, Nunica, MI (US)

(73) Assignee: Ergomotion, Inc., Goleta, CA (US)

( * ) Notice: Subject to any disclaimer, the term of this patent is extended or adjusted under 35 U.S.C. 154(b) by 67 days.

(21) Appl. No.: 18/828,438

(22) Filed: Sep. 9, 2024

(65) Prior Publication Data

US 2025/0082522 A1 Mar. 13, 2025

Related U.S. Application Data

(60) Provisional application No. 63/581,434, filed on Sep. 8, 2023.

(51) Int. Cl.

*A61G 7/005* (2006.01)
*A61G 7/015* (2006.01)
*A61G 7/018* (2006.01)
*A61G 7/05* (2006.01)

(52) U.S. Cl.

CPC ............ *A61G 7/005* (2013.01); *A61G 7/015* (2013.01); *A61G 7/018* (2013.01); *A61G 7/0503* (2013.01)

(58) Field of Classification Search

CPC ........ A61G 7/002; A61G 7/005; A61G 7/008; A61G 7/012; A61G 7/015; A61G 7/018; A61G 7/0503; A47C 20/04; A47C 20/041; A47C 20/042; A47C 20/043; A47C 20/045; A47C 20/046; A47C 20/047; A47C 20/048

See application file for complete search history.

(56) References Cited

U.S. PATENT DOCUMENTS

| | | | | | |
|---|---|---|---|---|---|
| 5,870,784 | A * | 2/1999 | Elliott | A47C 20/041 | 5/616 |
| 2008/0262657 | A1* | 10/2008 | Howell | A47C 20/041 | 700/275 |
| 2009/0211028 | A1* | 8/2009 | Richmond | A47C 20/08 | 5/717 |
| 2010/0186168 | A1* | 7/2010 | Harrison | A47C 20/041 | 5/616 |
| 2011/0247144 | A1* | 10/2011 | Oh | A47C 20/041 | 5/737 |
| 2014/0101863 | A1* | 4/2014 | Rohr | A47C 20/041 | 5/722 |
| 2015/0305510 | A1* | 10/2015 | Tarplee | A47C 20/041 | 601/57 |
| 2021/0145185 | A1* | 5/2021 | Negus | A47C 20/048 | |

FOREIGN PATENT DOCUMENTS

CN 218784338 U 4/2023

* cited by examiner

*Primary Examiner* — George Sun

(74) *Attorney, Agent, or Firm* — Bodman PLC

(57) ABSTRACT

An adjustable bed assembly includes a base frame, an articulating mattress support movably coupled to the base frame, and a support attachment assembly. The support attachment assembly includes a first linkage coupled to the articulating mattress support and a second linkage coupled to the first linkage and the base frame. The support attachment assembly includes a support attachment that may include a table top or a storage bin.

20 Claims, 15 Drawing Sheets

ADJUSTABLE BED ASSEMBLY HAVING A SUPPORT ATTACHMENT

CROSS-REFERENCE TO RELATED APPLICATION(S)

This application claims priority to and benefit of U.S. Provisional Application No. 63/581,434, filed Sep. 8, 2023, the entire disclosure of which is incorporated by reference herein.

TECHNICAL FIELD

This disclosure relates generally to the field of adjustable beds and more particularly relates to a storage or table support attachment for adjustable beds.

BACKGROUND

Adjustable beds are known to provide improved comfort to individuals by providing variable support firmness and/or positioning with adjustable panels, inflatable bladders, or the like. Moving the adjustable bed to place the user in different positions or postures can made it difficult access bedside storage or support furniture, such as a bedside table or nightstand, in a consistent and convenient manner.

It is therefore desirable to provide an innovative bed system with an articulating storage or support attachment that remains consistently accessible across the range of bed adjustment positions.

BRIEF DESCRIPTION OF THE DRAWINGS

These and other features and advantages of the present disclosure will be better understood by reference to the following detailed description of exemplary implementations when considered in connection with the accompanying drawings wherein.

DETAILED DESCRIPTION

Figure 1:
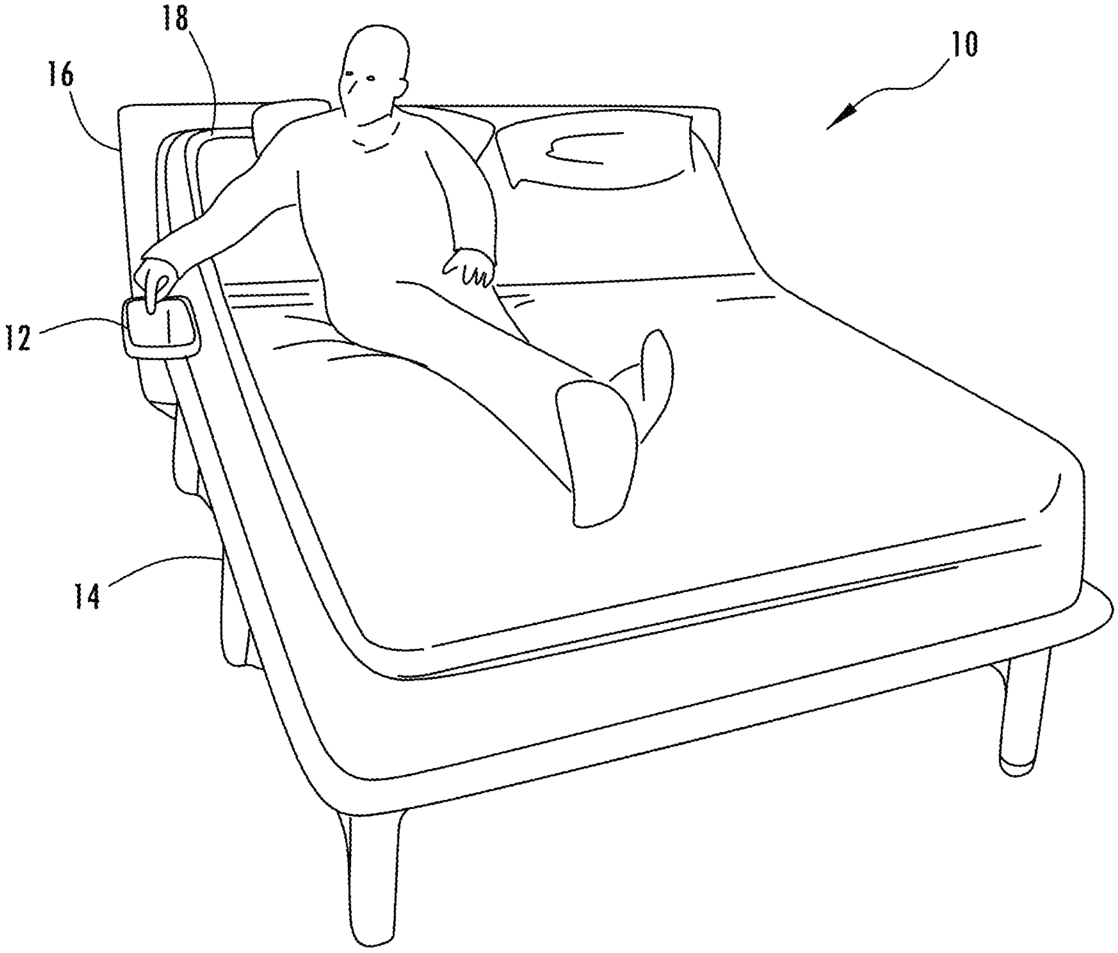
FIG. 1 is a front perspective view of an adjustable bed assembly.

Embodiments shown in the drawings and described herein provide an adjustable bed assembly including a support attachment assembly, which may include a storage attachment or a table attachment. Referring to the drawings, FIG. 1 illustrates an adjustable bed 10 having a support attachment 12 configured to remain level, that is parallel to a base support or base frame 14, while the adjustable bed 10 is transitioned between a flat position and an elevated position. The adjustable bed 10 may be adjustable in a number of different parameters associated with relative firmness or positioning of a user support, or in other aspects. In particular, the adjustable bed 10 may include an articulating mattress support 16 including, for example, an upper body support 18 that articulates from a horizontal, or flat, position supporting a user in a fully reclined posture, to an elevated or angled (e.g.) position supporting a user in a partially reclined or sitting posture. Exemplary articulation systems are known from, for example U.S. Pat. No. 11,497,666 B2, issued Nov. 15, 2022 and entitled Light Weight Self-Contained Articulating Assembly For Bed Frame Mounting; U.S. Pat. No. 10,709,623 B2, issued Jul. 14, 2020, and entitled Double Roller Compact Profile Actuation System For An Adjustable Bed; U.S. Pat. No. 10,602,851 B2, issued Mar. 31, 2020 and entitled Electric Bed Frame; U.S. Pat. No. 10,448,747 B2, issued Oct. 22, 2019 and entitled Articulating Bed Structure with Narrow Fram For Disassembly; and U.S. Pat. No. 10,188,568 B2, issued Jan. 29, 2019 and entitled Compact Profile Actuation System for an Adjustable Bed, the entireties of which are incorporated by reference herein. Other suitable articulation systems for bed frames are known from the adjustable base technology and products available from Ergomotion, Inc., of Santa Barbara, California.

The support attachment 12 is configured to remain in the same level orientation relative to the base frame 14 at a side of the upper body support 18 as the upper body support 18 moves between its horizontal position and its elevated position. The upper body support 18 may be selectively positionable anywhere in the range between a minimum position as fully reclined and a maximum elevation angle as the user is partially reclined or sitting up. The maximum elevation angle may depend on the particular articulation system, and may be, for example, 90°, 75°, 55°, or other suitable elevation angle.

The support attachment 12 may be implemented in multiple alternatives. The support attachment 12 may comprise a tabletop 30, a storage bin with or without a selectively openable cover, an integrated human-machine interface for controlling the actuation of the adjustable bed 10, other controllable device, or combinations thereof. The support attachment 12 may be extendable with portions that slide, pivot, rotate or unfold relative to one another to provide a movable or an expandable surface area in one configuration and reduced surface area in a second configuration. The support attachment 12 may incorporate electronics such as electronic charging or data port connections, keypad, touch-sensitive input device 38, switches or the like, that are connected via a wired or wireless connection to the bed control electronics, remote devices, or mains power. The support attachment 12 may include a cup holder 36 as shown in FIG. 3. The support attachment 12 may include finished portions such as upholstered, fabric wrapped or cushioned surfaces. The support attachment 12 may include rigid surfaces such as writing surfaces, laptop or keyboard support surfaces or brackets, or the like.

The support attachment 12 may be arranged to rotate about a fixed point of rotation or may rotate and translate relative to the upper body support 18. The implementation illustrated in FIGS. 2 and 3A-3D is arranged to rotate about a fix point, and the implementation illustrated FIGS. 4 and 5A-C rotates and translates relative to the upper body support 18. Although illustrated in connection with the implementation of FIGS. 4 and 5A-C, the support attachment of either implementation may be selectively disengaged from the adjustment mechanism to move to a retracted position, as illustrated in FIG. 6.

Figure 2:
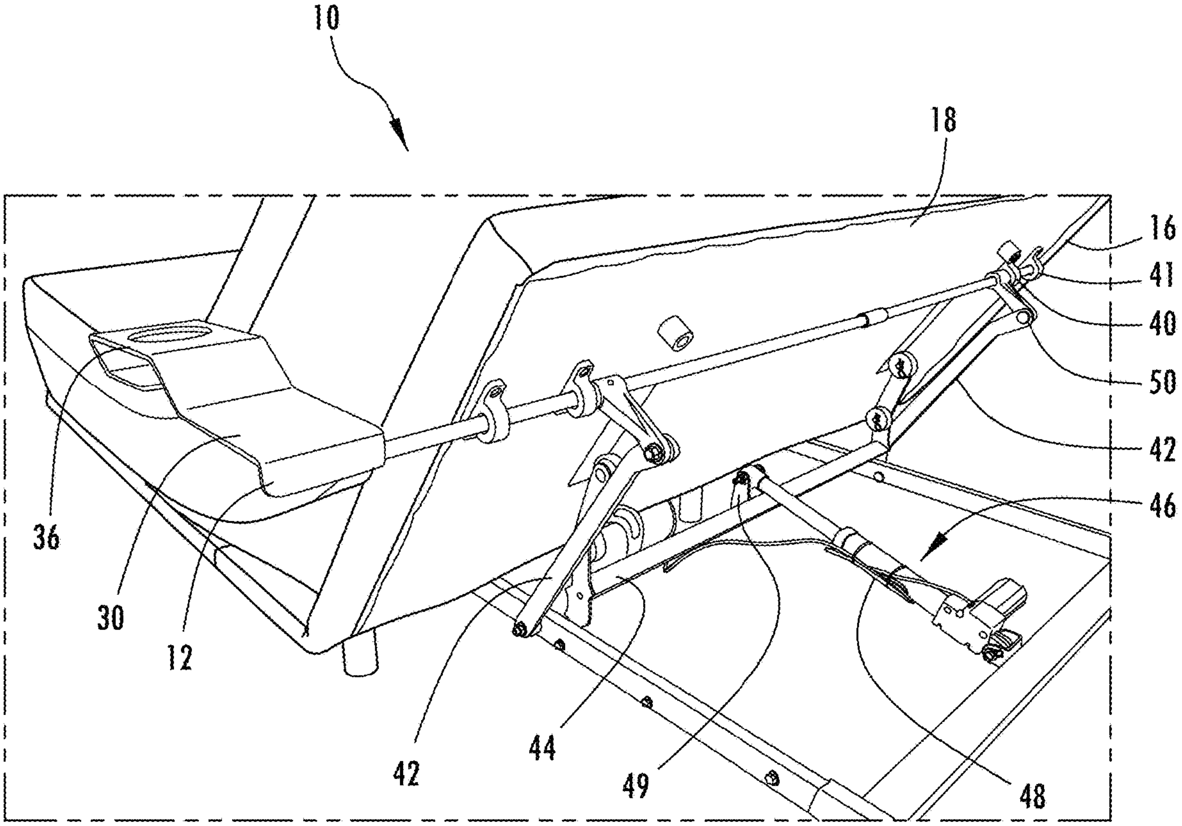
FIG. 2 is a rear perspective view of an adjustable bed assembly in a first implementation.

Referring now to FIG. 2, the support attachment 12 is supported on a first linkage 40 pivotally attached to the articulating mattress support 16 at couplers 41, which may take the form of a clevis bracket, pivot bushing bracket, swivel eye bracket, or the like. The first linkage 40 is pivotally attached to a second linkage 42. The second linkage 42 may be attached to the torsion bar 44 of the articulation mechanism 46 driving the motion of the articulating mattress support 16. Alternatively, the second linkage 42 may be attached to the base frame 14. Although illustrated as a solid linkage bar, the second linkage 42 may be implemented as a rigid member, such as a rod, bracket, beam, or as a flexible linkage such as a cable, chain or the like. The second linkage 42 may limit the motion of the support attachment in one articulation direction but not in the opposite direction. For example, as the articulating mattress support 16 rotates from the flat position to the elevated position, tension on the second linkage 42 will cause the support attachment 12 to rotate relative to the upper body support 18, maintaining the level orientation parallel to the base frame 14. In the opposite direction, as the upper body support 18 moves from the elevated position to the flat position, the second linkage 42 may not apply tension to the support attachment 12 so as to not create a closing pinch point between the underside of the support attachment 12 and the mattress, upper body support 18, or other components of the adjustable bed 10.

The articulation mechanism 46 may include a linear actuator 48 that acts on a lever arm 49 of the torsion bar 44, causing the torsion bar 44 to rotate. The rotation of the torsion bar 44 causes the upper body support 18 to rotate from a flat position to an elevated position for supporting a user in a seated posture. The rotation of the torsion bar 44 may also rotate the second linkage 42, which causes the first linkage 40 to rotate as the first linkage 40 lifts with the upper body support 18. The motion of the support attachment 12 is mechanically linked to and dependent on the motion of the articulating mattress support 16. The end of the support attachment 12 coupled to the first linkage 40 remains at the same point along the length of the upper body support 18 when in the flat position and in the elevated position.

Figure 3A:
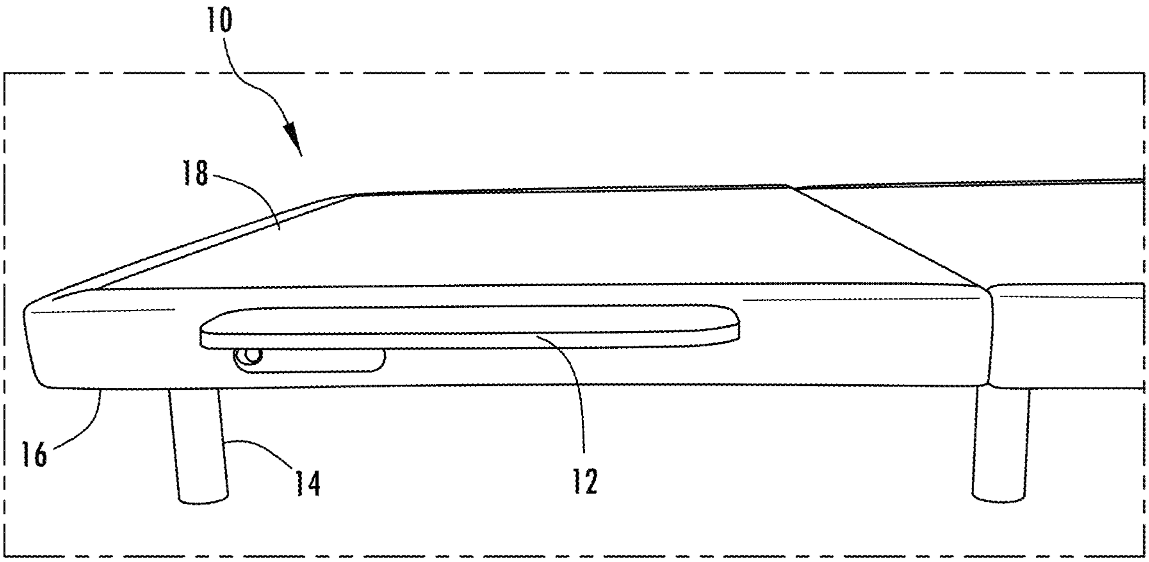
FIGS. 3A-3D illustrate a series of state transitions of adjusting an adjustable bed assembly between a flat position and an elevated position.
Figure 3B:
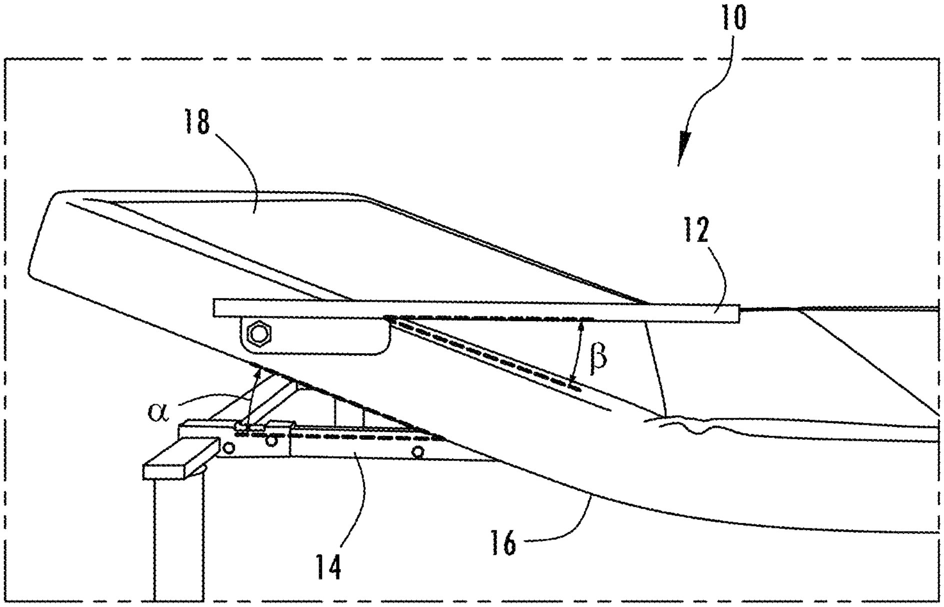
Figure 3C:
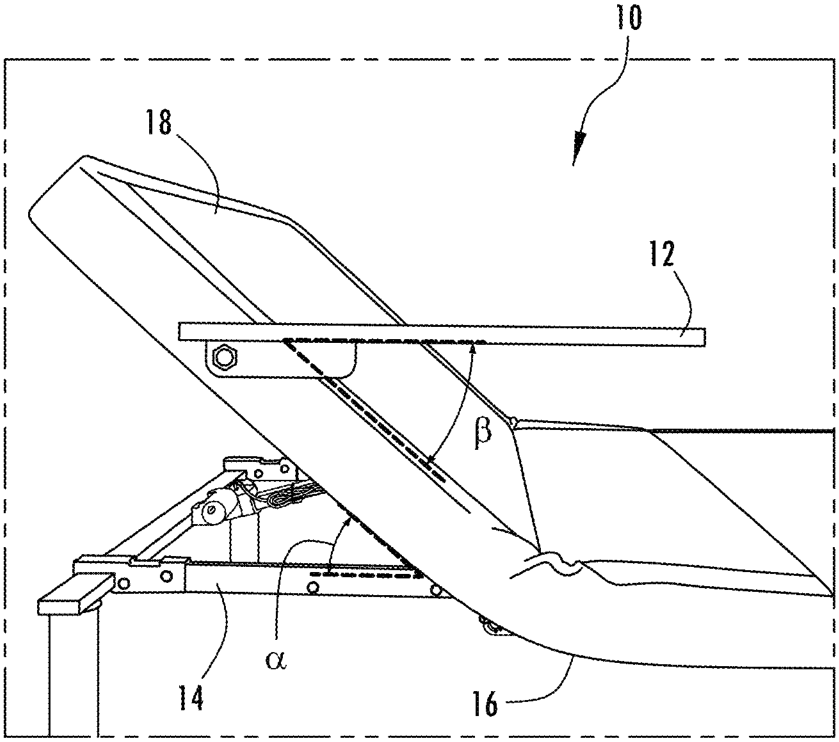
Figure 3D:
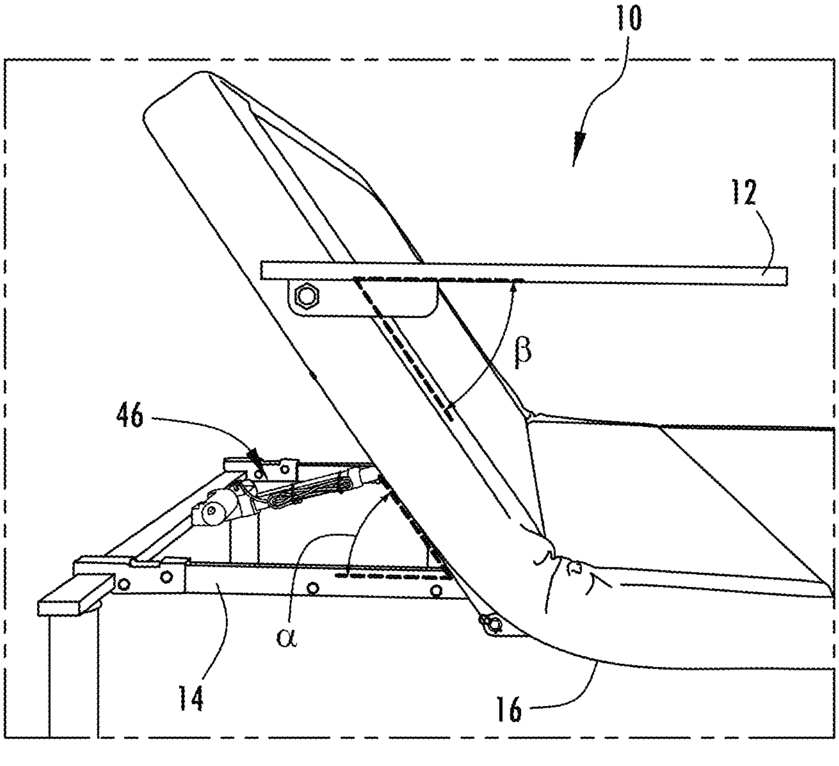
Figure 4:
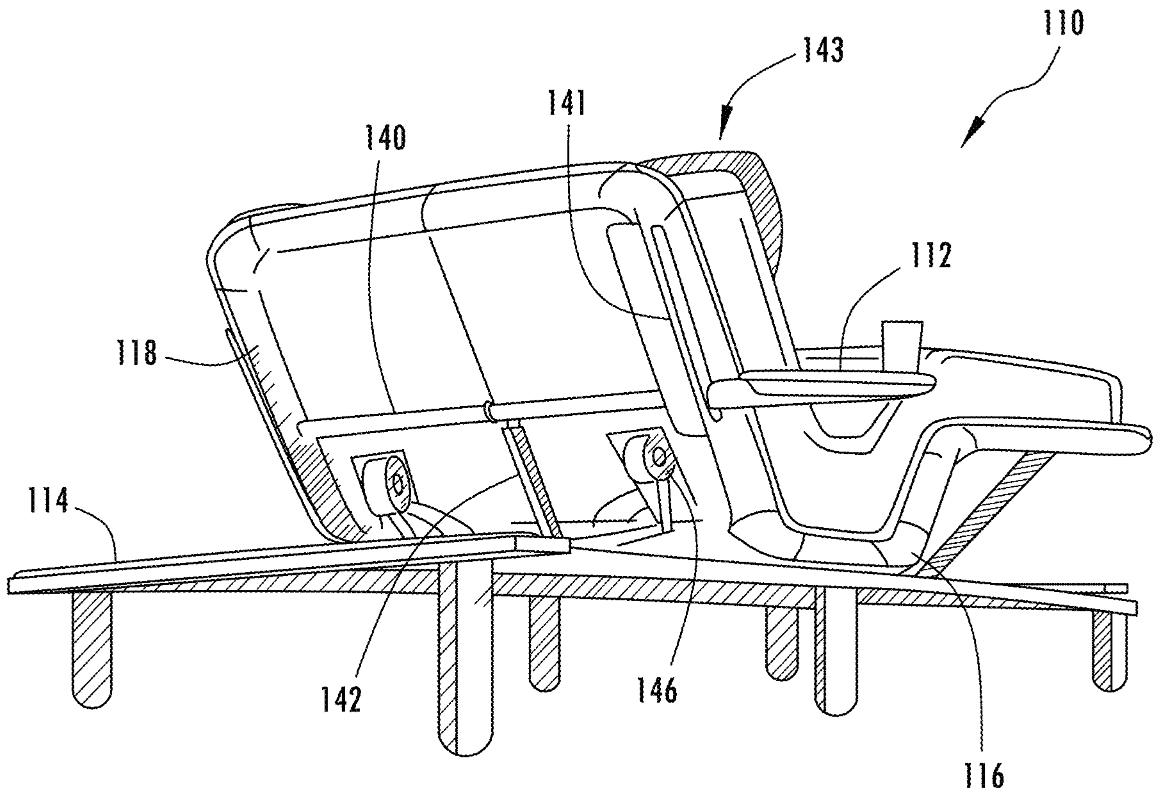
FIG. 4 is a rear perspective view of an adjustable bed assembly in a second implementation.

Referring now to FIGS. 3A-3B, a series of state transitions of adjusting an adjustable bed assembly 10 between a flat position and an elevated position is illustrated. In FIG. 3A, the adjustable bed 10 is in the fully reclined or flat position. In FIG. 3B, the adjustable bed 10 is in a first elevated position with the upper body support 18 at an angle α of about 20° from horizontal. The articulation mechanism 46 and linkages 40, 42 coordinate the position of the support attachment 12 with the upper body support 18 so that the angle β formed between the upper body support 18 and the support attachment 12 is equal to the angle α between the upper body support 18 and the base frame 14. Similar coordination persists throughout the range of articulation. Illustrated in FIGS. 3C and 3D, the adjustable bed 10 is disposed in elevated positions with the upper body support 18 at an angle α with respect to the base frame 14 of about 40° in FIG. 3C and about 55° in FIG. 3D. In each case, the angle β between the support attachment 12 and the upper body support 18 is equal to the angle α between the upper body support 18 and the base frame 14. The support attachment 12 pivots about a fixed point along the length of the upper body support 18 being supported on the first linkage 40, which is coupled to the upper body support 18 via the couplers 41.

Figure 5A:
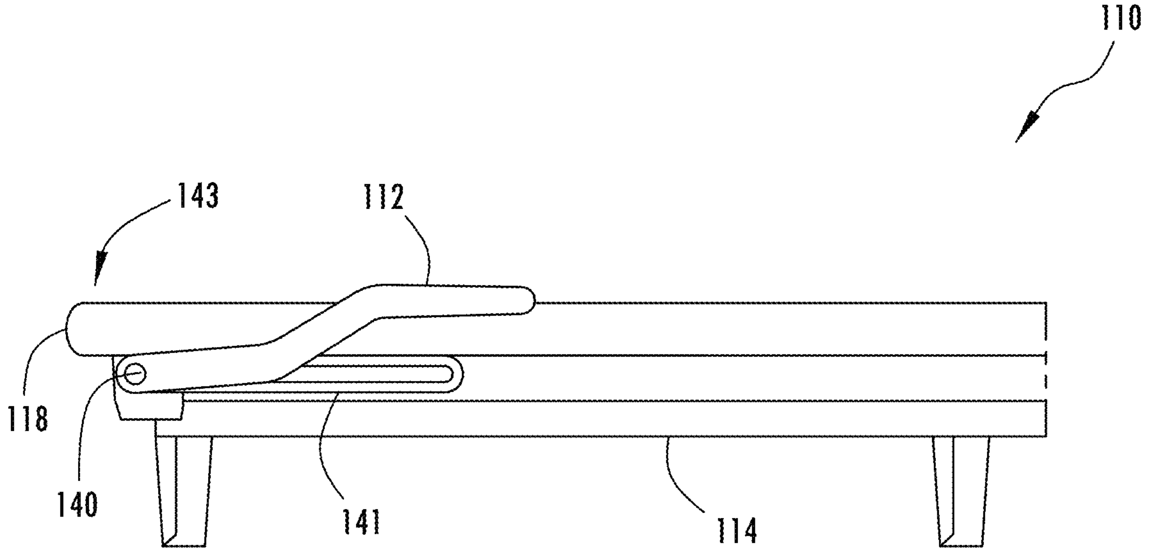
FIGS. 5A-5C illustrate a series of state transitions in adjusting an adjustable bed assembly between a flat position and an elevated position.
Figure 5B:
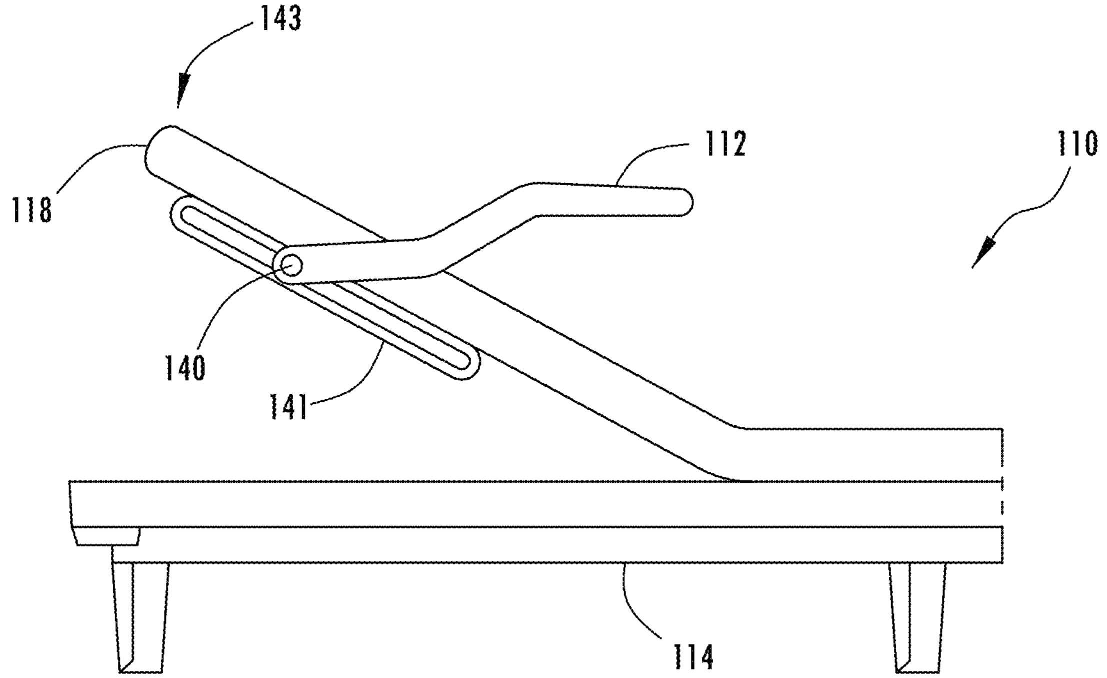
Figure 5C:
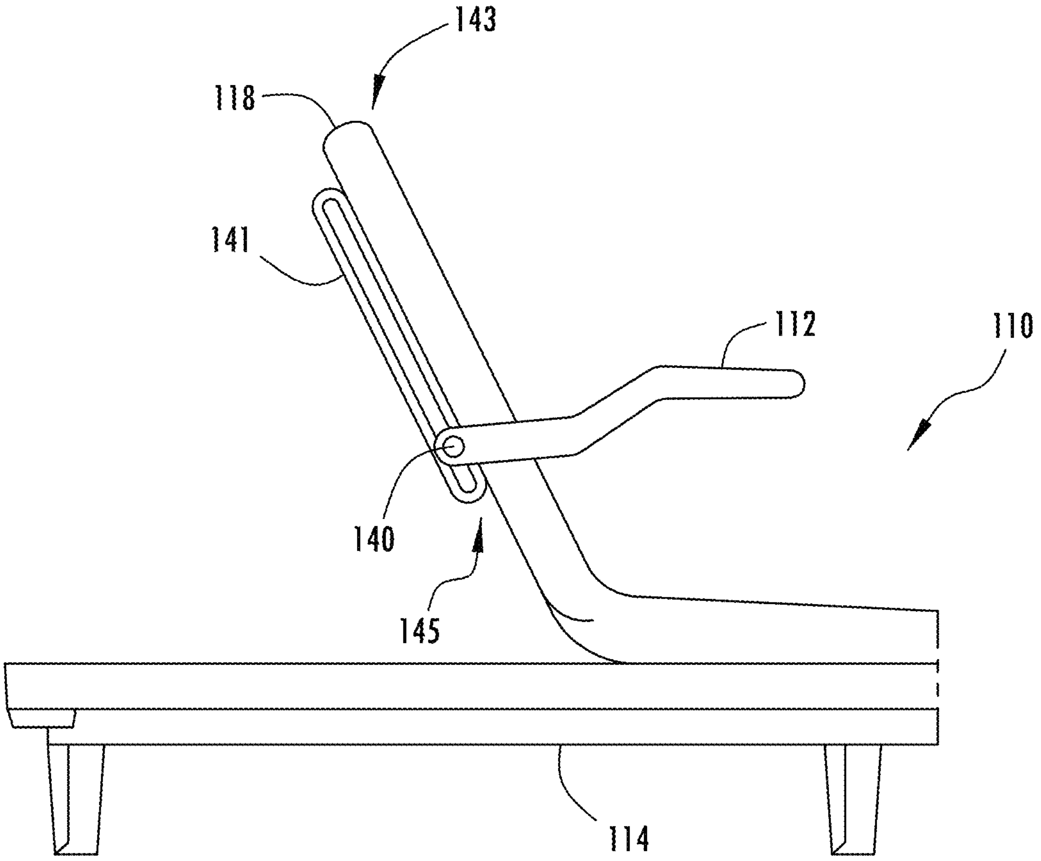
Figure 6:
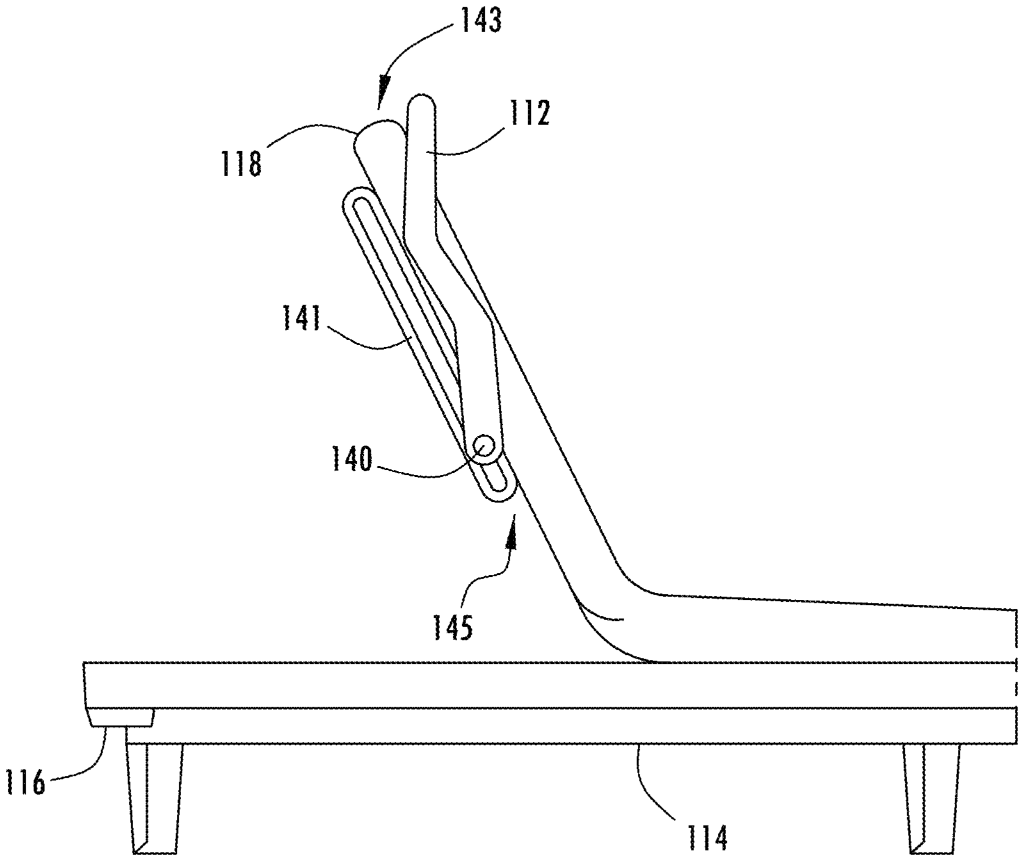
FIG. 6 is a schematic side view of an adjustable bed assembly in an elevated position with a support attachment in a retracted orientation.
Figure 7:
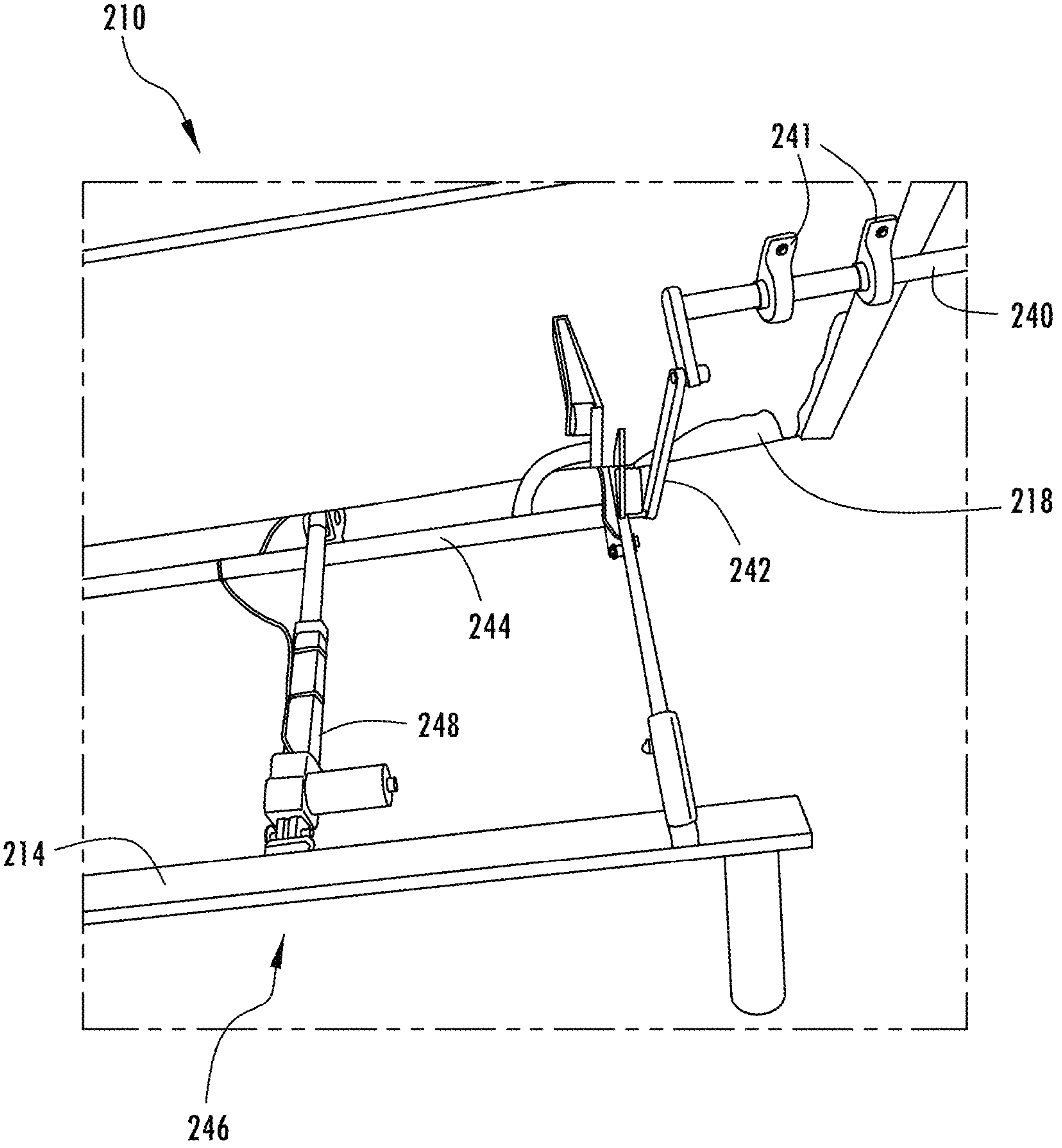
FIG. 7 is a partial rear perspective view of an adjustable bed assembly in a second implementation in an elevated position.
Figure 8:
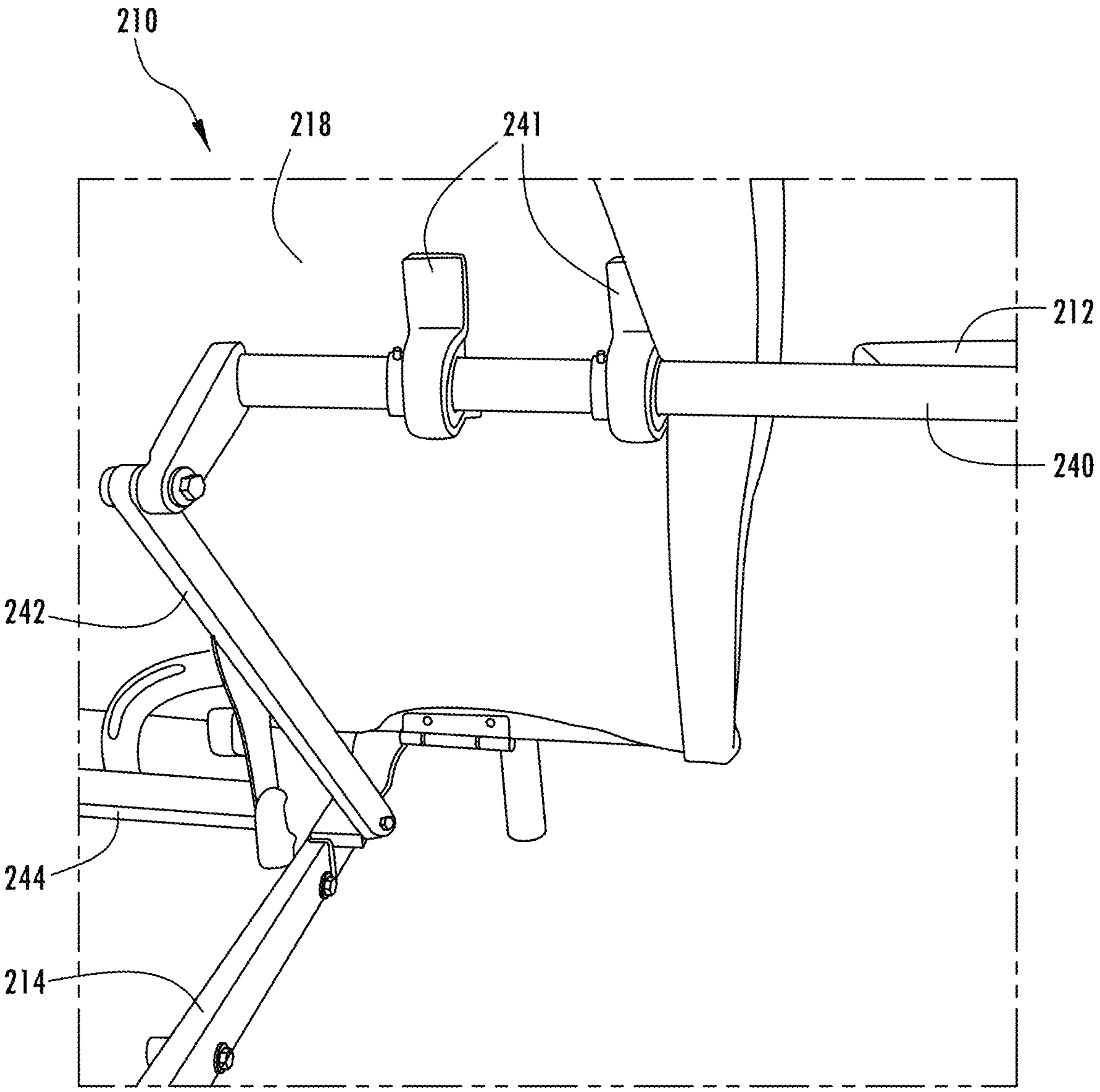
FIG. 8 is a partial detail view of the linkage arrangement of the adjustable bed assembly of FIG. 7.
Figure 9:
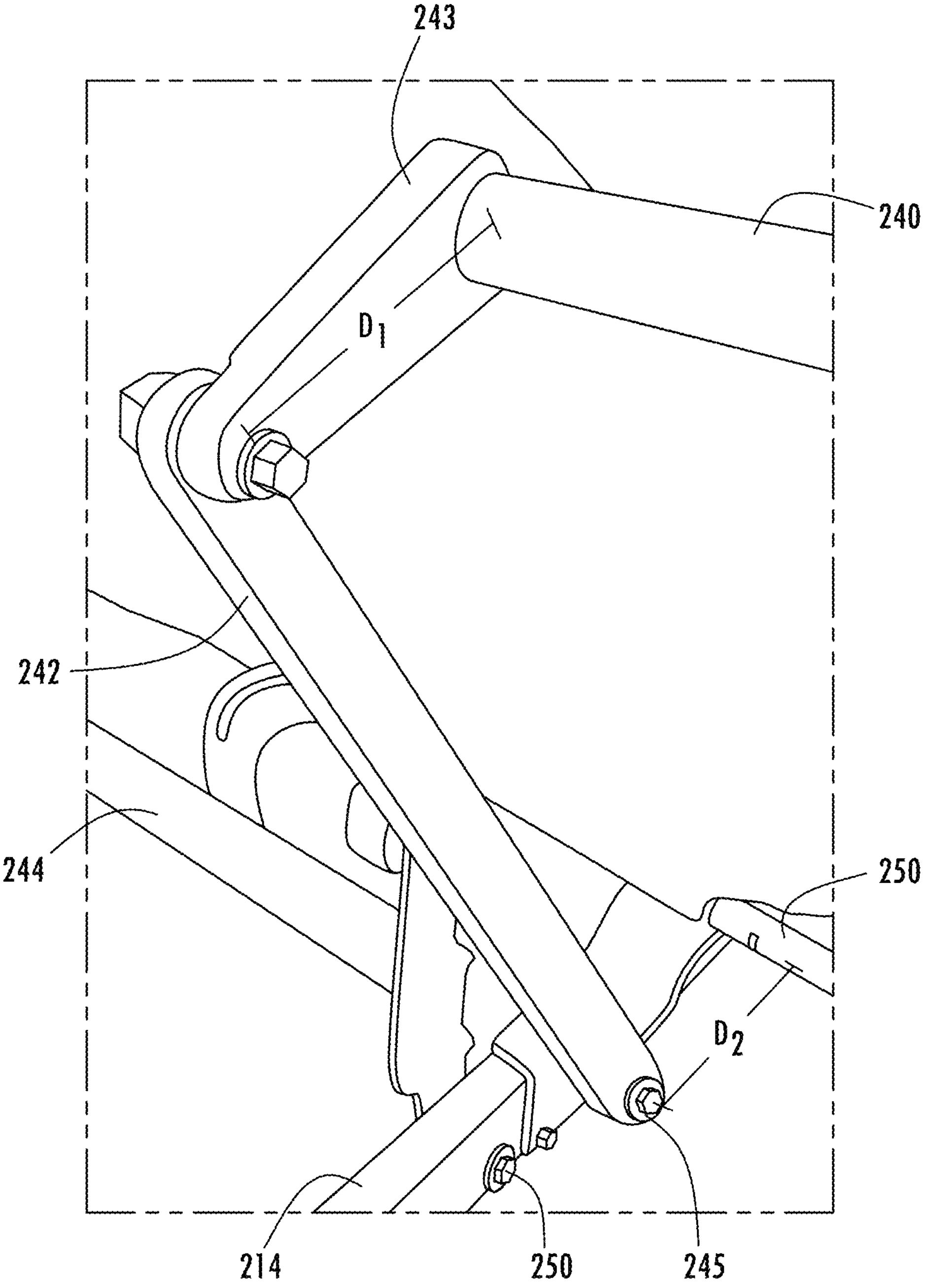
FIG. 9 is a partial detail view of a first side of the linkage arrangement of the adjustable bed assembly of FIG. 7.
Figure 10:
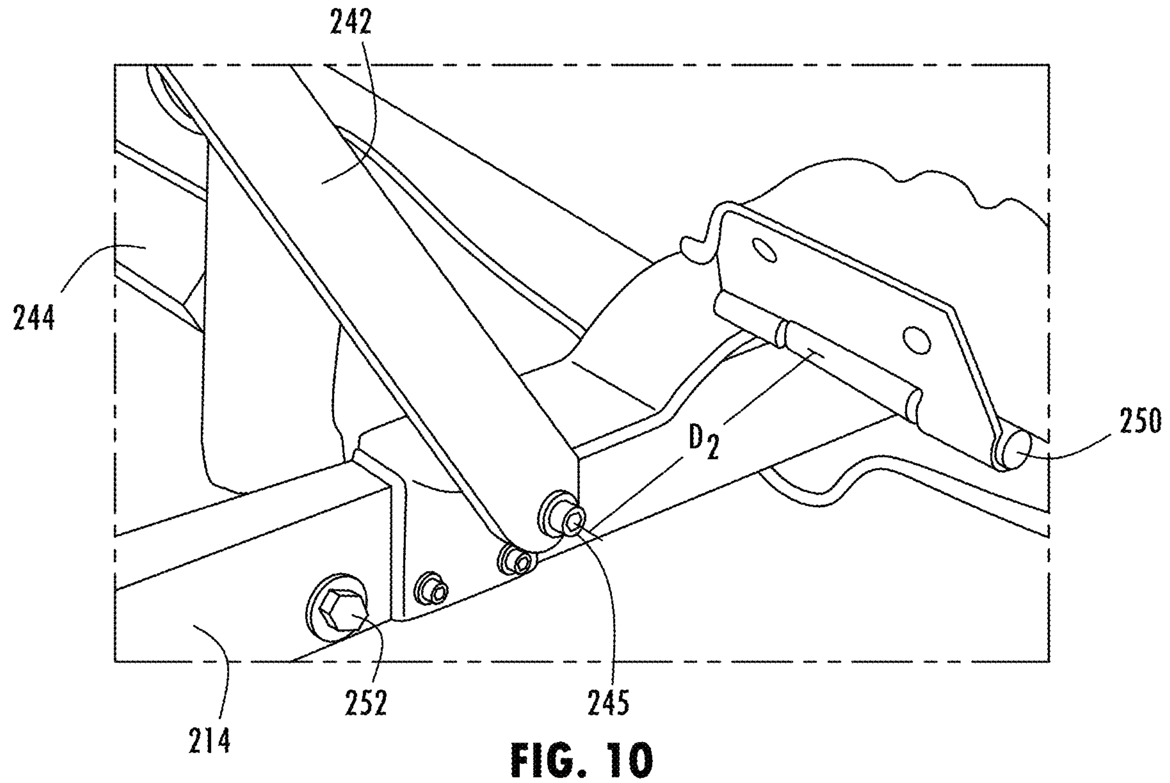
FIG. 10 is a partial detail view of a lower portion of the linkage arrangement of the adjustable bed assembly of FIG. 7.
Figure 11:
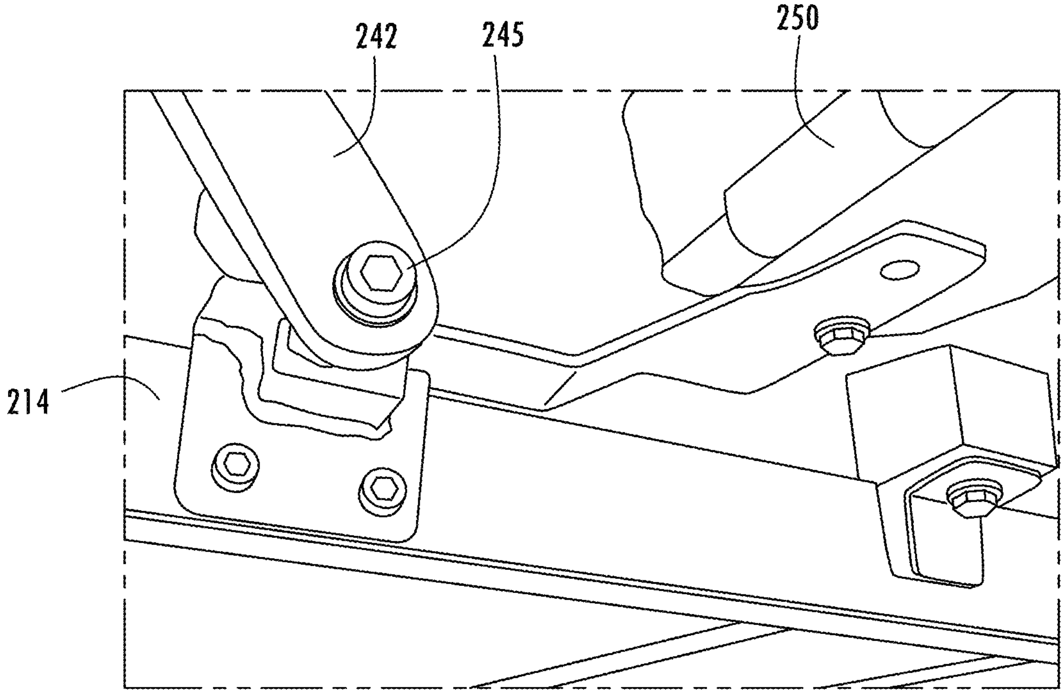
FIG. 11 is a partial detail view of a lower portion of the linkage arrangement of the adjustable bed assembly of FIG. 7.

Referring now to FIGS. 4 and 5A-C, an alternative implementation is illustrated. In the alternative implementation, the support attachment 112 is supported on a first linkage 140 attached to the articulating mattress support 116. In the illustrated implementation, the upper body support 118 includes an elongated slot 141 through which the first linkage 140 extends. The first linkage 140 is pivotally coupled to the second linkage 142. The second linkage 142 is coupled to the articulation mechanism 146 so that the movement of the articulating mattress support 116 causes the simultaneous movement of the upper body support 118 and the support attachment 112 to maintain the support attachment 112 level to the base frame 114. The second linkage 142 may be coupled to the articulation mechanism 146, directly or indirectly through one or more intermediate components. In one implementation, an actuator of the articulation mechanism 146 may operate directly on the upper body support 118, with the second linkage coupled to the upper body support 118. The arrangement of the first linkage 140 in the slot 141 allows the support attachment 112 to be disposed toward the head end 143 of the upper body support 118 when in the flat position, and to be disposed toward a middle position 145 of the upper body support 118 when in the elevated position. This transformation is illustrated in FIGS. 5A-5C.

The coupling between the support attachment 12, 112 and the first linkage 40, 140 may be rigidly constrained, or may be constrained with a limited amount of rotational freedom. More specifically, the support attachment 12, 112 may be pivotally coupled to the first linkage 40, 140 and constrained so that a downward force is resisted and the support attachment 112 has limited motion to remain level to the base frame 14, 114 in a first configuration. In a second configuration, the support attachment 12, 112 may be selectively rotated from a first use orientation into a second retracted orientation, for example, to enable easier ingress and egress of a user when the upper body support 118 is in the elevated position. This retracted orientation of the support attachment 112 is illustrated in FIG. 6. The support attachment 12, 112 may include a second rotational limiter to allow a range of motion of rotation of between 90° to about 120° or other suitable range measured from the level position illustrated in FIGS. 5A-5C. In other alternatives, the range of motion of rotation measured from the level position may be up to 180°, or up to 270°.

In other alternatives, the range of motion of the support attachment 12, 112 may be different depending on the position of the upper body support 18, 118. For example, the range of motion of the support attachment 12, 112 may be up to 90° when the upper body support portion 18, 118 is in the flat position and may be up to 270° when the upper body support portion is in the elevated position. The degree of freedom of the support attachment 12, 112 toward a retracted position may be at the coupling of the support attachment 12, 112 and the first linkage 40, 140 or else may be arranged at the coupling of the first linkage 40, 140 and the second linkage 42, 142.

Although illustrated having one support attachment 12, 112 on a first side of the adjustable bed 10, this is not intended to be limiting. Similarly, the first linkage 40, 140 may extend fully across the width of the adjustable bed 10 or only partway across the width of the adjustable bed 10. In one example, the adjustable bed 10 may be provided with a first support attachment 12, 112 on a first side of the adjustable bed 10 and a second support attachment on the opposite side of the adjustable bed 10 linked by a common first linkage 40, 140 extending the width of the adjustable bed 10. Where first and second support attachments are provided, each may be supported on a common first linkage 40, 140, or may be supported on separate individual first linkages. The first and second support attachments supported on a common linkage may be coupled for simultaneous rotation into a retracted position, or else may be separately coupled for independent rotation into the retracted position.

A second implementation of an adjustable bed 210 is illustrated in FIGS. 7-12. The adjustable bed 210 includes a support attachment 212, base frame 214, and an articulating mattress support 216 including an upper body support 218 supported on the base frame 214 for movement between a flat position and an elevated position. The support attachment 212 is supported on a first linkage 240 pivotally attached to the upper body support 218 at couplers 241. The first linkage 240 is pivotally attached to a second linkage 242 at a first end of the second linkage 242. The second linkage 242 is attached to the base frame 214 at a second end of the second linkage 242 opposite the first end. The support attachment 212 is supported on the linkage arrangement to maintain a horizontal orientation, parallel to the base frame 214, as the upper body support 218 moves between a flat position and an elevated position.

The adjustable bed 210 includes an articulation system 246, including a linear actuator 248 that acts on a lever arm 249 of a torsion bar 244, causing the torsion bar 244 to rotate. The rotation of the torsion bar 244 causes the upper body support 218 to move between the flat position and the elevated position. The movement of the upper body support 218 relative to the base frame 214 causes the support attachment 212 to move with the upper body support 218 due to the first linkage 240 being secured to the upper body support 218 at the couplers 241. The arrangement of the first and second linkages 240, 242, with the second linkage 242 being secured to the base frame 214 causes the support attachment 212 to maintain its horizontal position throughout the movement of the upper body support 218.

Additional features of the linkage arrangement are illustrated in FIGS. 8-12. In FIGS. 8-11, the upper body support 218 is in the elevated position, and in FIG. 12, the upper body support 218 is in the flat position. The first linkage 240 extends from the support attachment 212 partially along a back side of the upper body support 218. The first linkage 240 is secured for rotational movement to the upper body support 218 by couplers 241. The first linkage 240 includes a lever arm portion 243 that extends a distance $D_1$ perpendicular to an axis of rotation about which the first linkage 240 rotates. The second linkage 242 pivotally attaches to the first linkage 240 at the lever arm portion 243 the distance $D_1$ away from the axis of rotation about which the first linkage 240 rotates.

The second linkage 242 extends from the first linkage 240 to pivotally attach to the base frame 214 at a pivot point 245. The pivot point 245 is positioned along the base frame 214 at a location between the pivot point 250 where the upper body support 218 pivots with respect to the base fame, and the pivot point 252 where the torsion bar 244 connects to the base frame 214. The pivot point 245 of the second linkage 242 may be positioned about half-way between the pivot point 250 of the upper body support 218 and the pivot point 252 of the torsion bar 244. The pivot point 245 of the second linkage 242 may be spaced apart from the pivot point 250 of the upper body support 218 by a distance $D_2$. The distance $D_2$ may be equal to the distance $D_1$ along the base frame 214.

Figure 12:
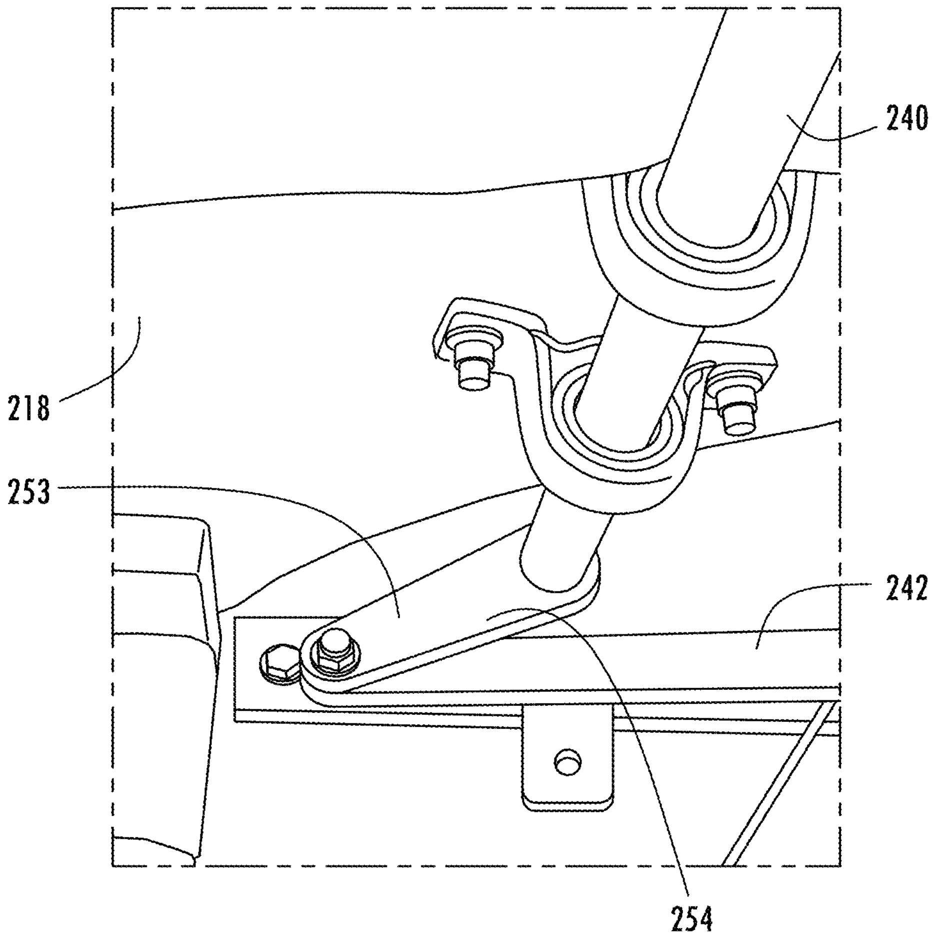
FIG. 12 is a partial detail view of a lower portion of the linkage arrangement of the adjustable bed assembly in the second implementation in a flat position.

Illustrated in FIG. 12, the upper body support 218 is in the flat position on the base frame 214. The second linkage 242 is in close proximity to the axis of rotation about which the first linkage 240 rotates. The first linkage 240 or the second linkage 242 may include a block 254 that prevents the second linkage 242 from extending longitudinally across the axis of rotation of the first linkage 240. In a situation where the second linkage 242 extends longitudinally across the axis of rotation of the first linkage 240, the linkage arrangement could bind or impede the free rotation of the upper body support 218.

Figure 13:
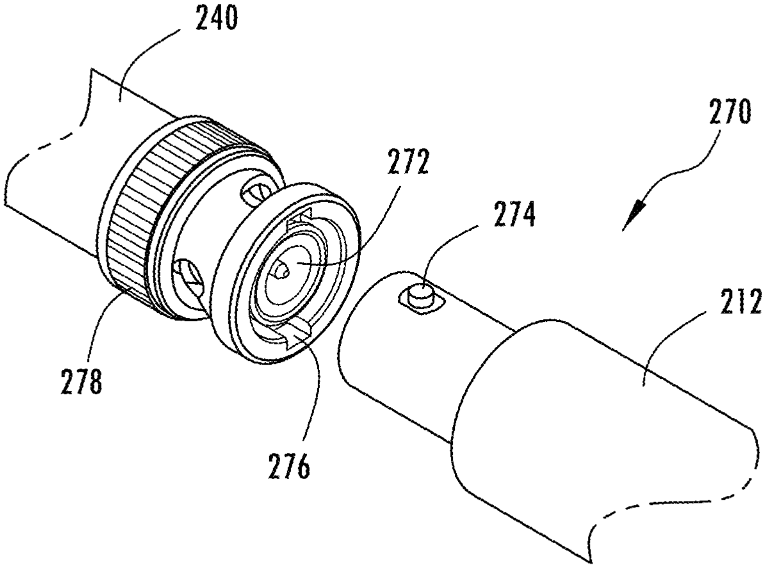
FIG. 13 is a first exemplary removable connection for connecting a support attachment to a linkage arrangement of an adjustable bed assembly.
Figure 14:
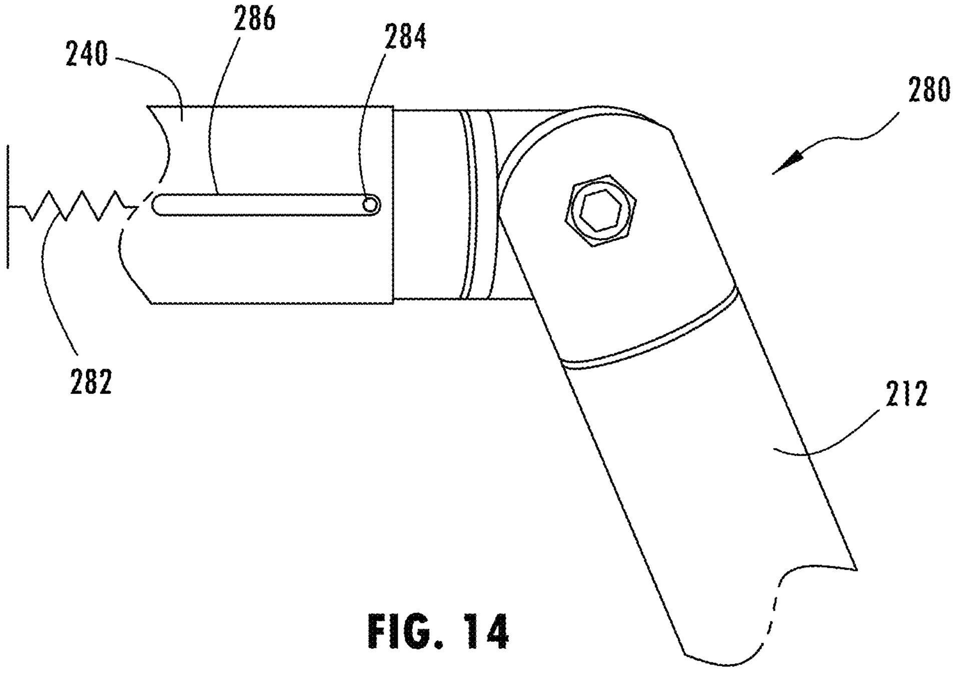
FIG. 14 is a second exemplary removable connection for connecting a support attachment to a linkage arrangement of an adjustable bed assembly.

Referring now to FIGS. 13 and 14, exemplary implementations are illustrated for connecting the support attachment 12, 112, 212 to the first linkage 40, 140, 240. It may be beneficial to provide a support attachment 12, 112, 212 that can be removed from or folded relative to the first linkage 40, 140, 240 for storage, transportation, or otherwise. Providing a removable connection, the support attachment 12, 112, 212 can be selectively replaced, for example to substitute different ones having alternative functions, such as substituting a writing surface with a storage bin, or other suitable replacements.

In a first illustrated alternative in FIG. 13, a bayonet-style mount 270 may provide a removable connection between the first linkage 40, 140, 240 and the support attachment 12, 112, 212. The bayonet-style mount 270 may incorporate an electrical connection 272 in addition to a mechanical attachment. The adjustable bed 10, 110, 210 may incorporate electronic components that would be beneficial to extend to and access at a support attachment 12, 112, 212 adjacent to the upper body support 18, 118, 218. For example, the support attachment 12, 112, 212 may incorporate user controls for controlling the adjustment of the adjustable bed 10, 110, 210. In addition, or in the alternative, the support attachment 12, 112, 212 may incorporate or provide electrical access for charging personal electronic devices and a bayonet-style mount 270 may provide an electrical connection to communicate main power from a power source to the support attachment 12, 112, 212.

The bayonet-style mount 270 may include one or more trunnions 274 formed on an extension 276 of the support attachment 12, 112, 212. The trunnions 274 are received and retained in corresponding slots 276 formed on the first linkage 240. The support attachment 12, 112, 212 may be secured to the bayonet-style mount 270 by rotating the trunnions 274 in the slots 276, or the slots 276 may be provided in a rotating sleeve 278 on the first linkage 40, 140, 240. This is not intended to be limiting and other selectively removable connector mounts may be employed.

In a second illustrated alternative in FIG. 14, a hinge joint 280 may be provided between the support attachment 12,112, 212, and the first linkage 40, 140, 240. The hinge joint 280 may be a sliding hinge joint 280 so that once straightened, the hinge joint 280 withdraws within the first linkage 40, 140, 240. The sliding hinge joint 280 may include a spring 282 to bias the joint 280 toward the withdrawn position, and requiring the application of force against the biasing of the spring 282 to extend from first linkage 40, 140, 240 to rotation about the hinge of the hinge joint 280. The hinge joint 280 may include a boss 284 engaged with a slot 286 formed in the first linkage 40, 140, 240 to limit the amount of travel of the sliding hinge joint 280. In an alternative implementation, the hinge joint 280 may be arranged in series with a second hinge joint 280 between the first linkage 40, 140, 240 and the support attachment 12, 112, 212 to allow the support attachment 12, 112, 212 to rotate fully behind the upper body support 18, 118, 218.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated. Similarly, the terms "supported," "joined," "mounted," in all their forms, should be understood similarly to include directly or indirectly, permanently or impermanently, rigidly or resiliently, unless stated otherwise.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An adjustable bed assembly comprising:

a base frame;

an articulating mattress support movably coupled to the base frame, the articulating mattress support configured to move relative to the base frame between a first position and a second position, the second position being elevated relative to the first position;

a first linkage coupled to the articulating mattress support for rotation relative thereto;

a support attachment coupled to the first linkage; and a second linkage coupled to the first linkage and to the base frame to maintain a level orientation of the support attachment relative to the base frame as the articulating mattress support moves between the first position and the second position;

wherein the support attachment comprises one of a tabletop, a storage bin, or a combination thereof.

2. The adjustable bed assembly of claim 1, further comprising an articulation mechanism supported on the base frame and arranged to articulate the articulating mattress support between the first position and the second position;

wherein the articulation mechanism comprises a linear actuator coupled to the base frame and a torsion bar, wherein the torsion bar is coupled to the articulating mattress support and rotation of the torsion bar articulates the articulating mattress support between the first position and the second position;

wherein the first position is a flat position for supporting a user in a fully-reclined posture;

wherein the second position is an elevated position for supporting the user in a sitting posture;

wherein the support attachment is movable between a first orientation and a second orientation; and wherein the first orientation is a use orientation where the support attachment extends substantially parallel to the base frame, and wherein the second orientation is a retracted orientation.

3. The adjustable bed assembly of claim 1, wherein the first position is a flat position for supporting a user in a fully-reclined posture; and wherein the second position is an elevated position for supporting the user in a sitting posture.

4. The adjustable bed assembly of claim 1, wherein the support attachment is movable between a first orientation and a second orientation.

5. The adjustable bed assembly of claim 4, wherein the first orientation is a use orientation where the support attachment extends substantially parallel to the base frame, and wherein the second orientation is a retracted orientation.

6. The adjustable bed assembly of claim 5, wherein the support attachment is movable between the first orientation and the second orientation via rotation.

7. The adjustable bed assembly of claim 6, wherein the retracted orientation is at least 90° away from the use orientation.

8. The adjustable bed assembly of claim 7, wherein the support attachment is rotatable in a range of up to 270°.

9. An adjustable bed assembly comprising:

a base frame;

an articulating mattress support movably coupled to the base frame, the articulating mattress support configured to move relative to the base frame between a first position and a second position, the second position being elevated relative to the first position;

a first linkage coupled to the articulating mattress support for rotation relative thereto;

a support attachment coupled to the first linkage; and a second linkage coupled to the first linkage and to the base frame to maintain a level orientation of the support attachment relative to the base frame as the articulating mattress support moves between the first position and the second position; and an articulation mechanism supported on the base frame and arranged to articulate the articulating mattress support between the first position and the second position; wherein the articulation mechanism comprises a linear actuator coupled to the base frame and a torsion bar, wherein the torsion bar is coupled to the articulating mattress support and rotation of the torsion bar articulates the articulating mattress support between the first position and the second position.

10. The adjustable bed assembly of claim 9, wherein the second linkage is coupled to the base frame via the torsion bar such that rotation of the torsion bar rotates the second linkage to couple motion of the first linkage to motion of the articulating mattress support.

11. The adjustable bed assembly of claim 10, wherein the first linkage comprises a lever arm, and wherein the second linkage is coupled to the first linkage via the lever arm.

12. An adjustable bed assembly comprising:

a base frame;

an articulating mattress support movably coupled to the base frame, the articulating mattress support configured to move relative to the base frame between a first position and a second position, the second position being elevated relative to the first position;

a first linkage coupled to the articulating mattress support for rotation relative thereto;

a support attachment coupled to the first linkage;

a second linkage coupled to the first linkage and to the base frame to maintain a level orientation of the support attachment relative to the base frame as the articulating mattress support moves between the first position and the second position; and an articulation mechanism supported on the base frame and arranged to articulate the articulating mattress support between the first position and the second position, and wherein the support attachment comprises an input device for controlling the articulation mechanism.

13. The adjustable bed assembly of claim 12, wherein the support attachment comprises one of a tabletop, a storage bin, or a combination thereof.

14. A support attachment assembly for an adjustable bed, the support attachment assembly comprising:

a support attachment;

a first linkage coupled to the support attachment and configured for attachment to an articulating mattress support movable between a first position and a second position;

a second linkage pivotably coupled to the first linkage and configured for coupling with a bed frame; and the first linkage and the second linkage arranged to maintain the support attachment in a level orientation as the articulating mattress support moves between the first position and the second position;

wherein the support attachment comprises one of a tabletop, a storage bin, or a combination thereof.

15. The support attachment assembly of claim 14, wherein the support attachment is movable between a first orientation and a second orientation via rotation.

16. The support attachment assembly of claim 14, wherein the support attachment is removably coupled to the first linkage via a bayonet-style mount.

17. A support attachment assembly for an adjustable bed, the support attachment assembly comprising:

a support attachment;

a first linkage coupled to the support attachment and configured for attachment to an articulating mattress support movable between a first position and a second position;

a second linkage pivotably coupled to the first linkage and configured for coupling with a bed frame; and the first linkage and the second linkage arranged to maintain the support attachment in a level orientation as the articulating mattress support moves between the first position and the second position;

wherein the support attachment is removably coupled to the first linkage via a bayonet-style mount; and wherein the bayonet-style mount includes an electrical connection.

18. The support attachment assembly of claim 17, wherein the support attachment comprises one of a tabletop, a storage bin, or a combination thereof.

19. A support attachment assembly for an adjustable bed, the support attachment assembly comprising:

a support attachment;

a first linkage coupled to the support attachment and configured for attachment to an articulating mattress support movable between a first position and a second position;

a second linkage pivotably coupled to the first linkage and configured for coupling with a bed frame; and the first linkage and the second linkage arranged to maintain the support attachment in a level orientation as the articulating mattress support moves between the first position and the second position;

wherein the support attachment is coupled to the first linkage via a hinge joint.

20. The support attachment assembly of claim 19, wherein the hinge joint is a sliding hinge joint.

* * * * *